United States Patent [19]

Sabol et al.

[11] Patent Number: 5,805,525
[45] Date of Patent: Sep. 8, 1998

[54] METHOD AND APPARATUS FOR HYDROACOUSTIC DETECTION AND CHARACTERIZATION OF SUBMERSED AQUATIC VEGETATION

[75] Inventors: Brace Mayo Sabol, Vicksburg; Richard Lawrence Kasal, Edwards; Riley Eddie Melton, Jr., Vicksburg, all of Miss.

[73] Assignee: The United States of America as represented by the Secretary of the Army, Washington, D.C.

[21] Appl. No.: 763,340

[22] Filed: Dec. 11, 1996

[51] Int. Cl.$^6$ ..................................................... G01S 15/89
[52] U.S. Cl. ............................................... 367/87; 367/99
[58] Field of Search .................................. 367/87, 88, 99

[56] References Cited

U.S. PATENT DOCUMENTS

| | | | |
|---|---|---|---|
| 2,871,638 | 2/1959 | Jones | 324/1 |
| 3,447,124 | 5/1969 | Louviere et al. | 340/4 |
| 3,478,308 | 11/1969 | Stanley et al. | 340/3 |
| 3,555,499 | 1/1971 | MacDonald et al. | 340/3 |
| 3,739,325 | 6/1973 | Ludwig | 367/97 |
| 4,186,373 | 1/1980 | Thompson | 367/131 |
| 4,796,238 | 1/1989 | Bourgeois et al. | 367/87 |
| 4,807,199 | 2/1989 | Yamameto et al. | 367/15 |
| 5,022,262 | 6/1991 | Hulsbergen et al. | 73/170 A |
| 5,444,670 | 8/1995 | Douglas | 367/90 |
| 5,606,533 | 2/1997 | Cranford et al. | 367/88 |

OTHER PUBLICATIONS

Duarte, C.M. 1987. Use of echosounder tracings to estimate the above ground biomass of submerged plants in lakes. Can. J. Fish. and Aquatic Sci., 44:732–735.

Maceina, M.J., Shireman, J.V., Langland, K.A., and Canfield, D.E. 1984. Prediction of submerged plant biomass by use of a recording fathometer. J. Aquatic Plant Management, 22:35–38.

Miner, S.P. 1993. "Application of acoustic hydrosurvey technology to the mapping of eelgrass (Zostera marina) distribution in Humboldt Bay, California," Coastal Zone '93 . . .

Thomas, G.L., Marino, D.A., Thorne, R.E., and Pauley, G.B. 1984. An evaluation of fisheries sonar techniques as a tool for measuring aquatic macrophyte biomass. pp. 153–157. in Proceedings 19th Annual Meeting Aquatic Plant Control Research Program. Miscellaneous Paper A–85–4. U.S. Army Engineer Waterways Experiment Station. Vicksburg, MS.

Thomas G.L., Thiesfield, S.L., Bonar S.A., Crittenden, R.N., and Pauley, G.B. 1990. Estimation of submerged plant bed biovolume using acoustic range information. Can. J. Fish. and Aquatic Sci., 47 (4) :805–812.

*Primary Examiner*—Ian J. Lobo
*Attorney, Agent, or Firm*—Luther A. Marsh

[57] ABSTRACT

Disclosed is a method of detecting the bottom of a waterbody in the presence of overlying submersed aquatic vegetation (SAV) and of characterizing physical attributes of that overlying vegetation. A narrow-beam hydroacoustic transducer is mounted on a mobile survey boat in a vertically-downward orientation. A rapid series of short pulses (pings) are generated by the transducer as the boat traverses a predetermined path within the waterbody. Raw hydroacoustic echo-level data is digitally recorded along with position data generated by some electronic position measurement system. The methodology for processing the raw signal is implemented in a digital computer algorithm which extracts hydroacoustic signal features and applies classification decision rules which were developed based on common physical characteristics of aquatic environments containing SAV. An apparatus for carrying out this method is also disclosed.

7 Claims, 4 Drawing Sheets

METHOD AND APPARATUS FOR HYDROACOUSTIC DETECTION AND CHARACTERIZATION OF SUBMERSED AQUATIC VEGETATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to methods and apparatus for testing and measuring and, in particular, for measuring bottom characteristics of oceans, rivers and lakes.

(2) Brief Description of the Prior Art

For the purpose of this disclosure an ocean, river or lake in which the method and apparatus of this invention may be employed is referred to as a "waterbody".

Currently available techniques for the detection and measurement of submerged aquatic vegetation (SAV) in waterbodies fall into two groups, contact sampling or observation, and remote techniques. Contact techniques require either actual contact with the plants or that some measurement or observation be made in the immediate proximity of the plants. This group of techniques makes use of rakes, quadrats, mechanical samplers, and diver sampling and observation. Such techniques are time and labor intensive, and they sample only very limited areas. It is also not usually practical to use these techniques to accurately determine spatial distribution of SAV.

Currently operational remote techniques are primarily limited to optical-based techniques for which the plants must be visible from the water's surface in order to be detected. This need for visibility of plants leads to a systematic underestimation of plant distribution because there are usually extensive areas of established plants not visible from the water's surface.

Hydroacoustics has been suggested as a means of detecting and mapping vegetation. Hydroacoustic techniques have, however, not been successfully implemented into a fully automated capability including detection, position referencing and mapping due in part to previous limitations in bottom detection capabilities in areas containing SAV. When the bottom is not correctly detected, it is not possible to perform subsequent tasks relating to the detection and characterization of SAV.

A need therefore exists for a method and apparatus for detecting and characterizing SAV by hydroacoustical means which makes use of an effective bottom finding capability.

SUMMARY OF THE INVENTION

In the method of the present invention for detecting and characterizing submerged aquatic vegetation (SAV) a calibrated, high frequency, narrow-beam, transmitting/receiving hydroacoustic transducer is mounted on a boat at the water's surface and aimed vertically downward. While the boat transverses a prescribed path within the waterbody, the transducer transmits a rapid series of short pulses (pings) and records the signal strength of returning echoes. These echo data are digitally recorded at a high range resolution, that is, with a depth increment no larger than a few centimeters. Position data from an electronic positioning system such as the Global Positioning System (GPS) are simultaneously measured (at a rate significantly slower than the ping rate of the transducer) and recorded on the same data file. The resulting file is a position-referenced digital file of the raw hydroacoustic signal and is obtained using entirely off-the-shelf, commercially-available equipment.

The invention consists of a novel technique for processing these data which correctly detects the bottom in the presence of overlying vegetation and characterizes physical attributes of that overlying vegetation. Since the ping rate of the transducer operates at a faster rate than the GPS reporting rate, there are many ping reports between successive GPS reports. All ping reports between successive GPS reports (referred to as pings in a "cycle") are digitally processed as an ensemble with output reports generated to coincide with GPS reports. Each ping in the cycle is examined to determine the depth at which the largest rise in voltage squared occurs, or alternatively, at which the sharpest rise in some other engineering unit related to acoustical intensity occurs. Each such depth is recorded in a histogram. Once all pings in the cycle have been so analyzed the mode of the smoothed histogram is determined. This depth is declared the bottom depth. If this current depth is within a user-defined vertical distance limit of the bottom depth from the previous cycle, then it is declared a valid bottom. Once a valid bottom is declared for a cycle, the hydroacoustic signal in the water column immediately above this bottom is examined in each ping within the cycle. Overlying vegetation is detected by examining the spatial distribution of the hydroacoustic signal which is stronger than a user-defined noise threshold. When present, vegetation exhibits a signature pattern characterized by a series of contiguous depth increments which have an echo level greater than the user-defined noise threshold, show "connection" to the bottom, and typically vary in height from ping to ping within the cycle. A set of signature features and decision rules were derived from these signature characteristics and were implemented in a digital computer algorithm which performs the processing and outputs a file of position-referenced attributes (bottom depth, plant coverage and plant height). This file can be directly input into a commercially-available geographic information system (GIS) or mapping system software to perform spatial interpolation and map generation.

The components required to use this invention include:

a) Hydroacoustic System. A digital hydroacoustic depth sounder system with a high frequency ($\geq 200$ KHz), narrow bean ($\leq 10$ degrees) transducer capable of generating short pulses ($\leq 0.2$ millisecond) at a rate of at least 5 Hz. The system should be calibrated (or calibratable), have high dynamic range ($\geq 60$ dB), have a digitalized output rate corresponding to a depth increment of no more than 4 centimeters and be capable of digitally recording raw hydroacoustic signal as well as position data input from the positioning system, described below. The invention currently makes use of a Biosonics DT4000 sounder (Biosonics, Inc., Seattle Wash.) with a 420 KHz, 6 degree beam width transducer, but other equipment could potentially be adapted for use.

b) Electronic Positioning System. The positioning system should generate position output in some recognized coordinate system (latitude/longitude, state plane coordinates, or UTM) at a rate of at least 0.5 Hz, with an absolute horizontal position accuracy of 5 meters or better. The invention currently uses a real-time differentially-corrected global positioning system (GPS) manufactured by Trimble Navigation (Trimble Navigation Limited, Austin, Tex.), but other vendor systems could be used.

c) Computing System. The computer system needs to satisfy the requirements of the hydroacousLic system and the positioning system, and have adequate hard disk storage space to record digital data and adequate processing speed for sounder operations. The invention currently uses an NEC Versa DX4 486 lap top PC with a 75 MHz clock speed and 586 Mbytes of hard disk storage, but several other PC systems could be used.

d) Mapping Software. The mapping software must be capable of imputing an ASCII file of position referenced attributes, performing spatial interpolation and generating map products. The invention currently can use ARC/Info (Environmental Systems Research Institute, Redlands, Calif.) and SURFER (Golden Software, Inc., Golden, Colo.), but other vendor mapping systems could be used.

BRIEF DESCRIPTION OF THE DRAWINGS

The invention is further described with reference to the accompanying drawings in which.

DETAILED DESCRIPTION OF THE PREFERRED EMBODIMENT (a) SAVEWS Description. The Submersed Aquatic Vegetation Early Warning System (SAVEWS) is an integral electronic measurement system developed which is intended for near-real-time detection and mapping of submersed aquatic vegetation (SAV) before it is detectable by other remote detection methods. It consists of off-the-shelf, commercially-available components including a digital hydroacoustic sounder system, global positioning system (GPS) equipment and geographic information system (GIS) software.

Figure 1:
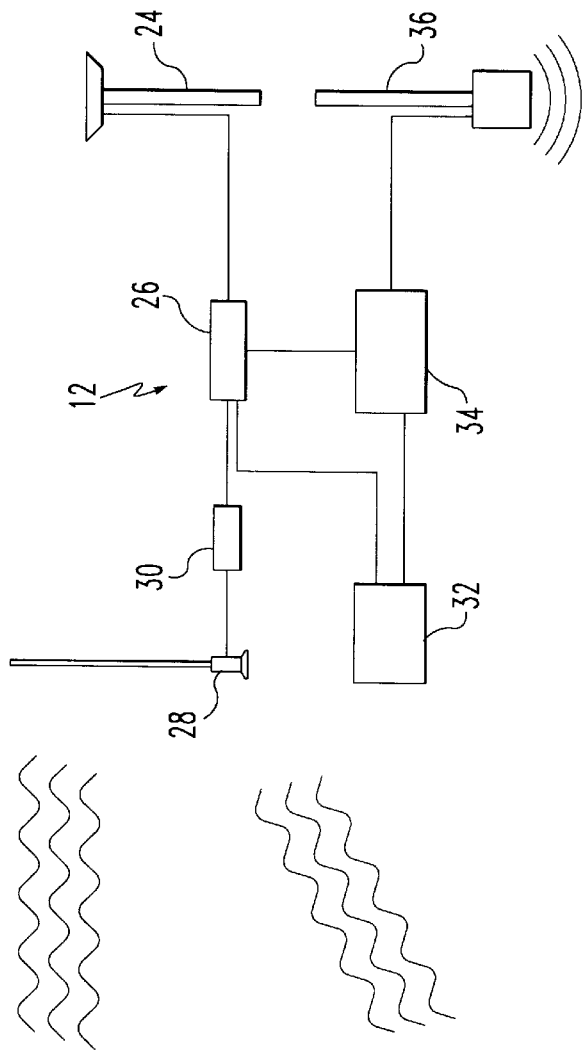
FIG. 1 is a schematic drawing showing a preferred embodiment of the apparatus of the present invention.
Figure 1:
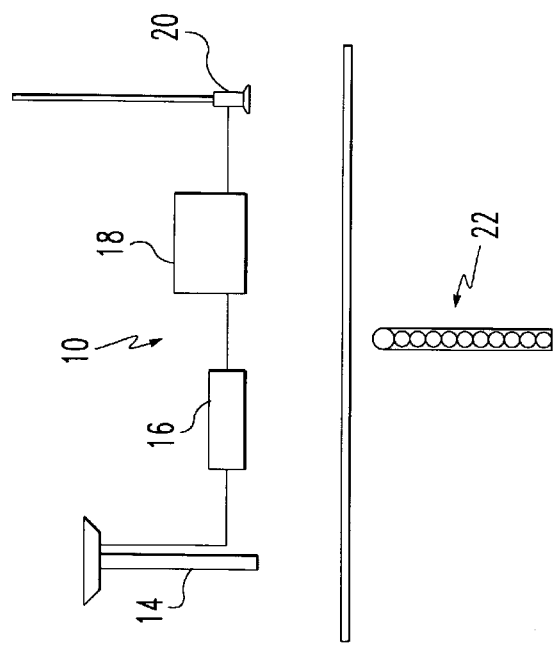

The SAVEWS is illustrated schematically in FIG. 1. The two major units of the system are the shore unit (GPS base station) and the mobile unit shown generally at numeral 12. In one embodiment the shore unit (base station) shown generally at numeral 10 comprises a GPS receiver 16 which is connected to a GPS antenna 14 and a data radio transmitter 18 which is connected to radio antenna 20. Alternatively the shore unit may be a navigation beacon 22 as, for example, operated by the United States Coast Guard. The GPS base station computes pseudorange corrections for each satellite visible and transmits these to the mobile unit. Additionally, commercial differential GPS services may also be used. The mobile unit 12 comprises a GPS antenna 24 which is connected to a GPS receiver 26. The mobile unit 12 also includes a radio antenna 28 which is connected to a data radio receiver 30 which is connected to the GPS receiver 26. The GPS receiver 26 processes the GPS satellite data and the base station data to compute a differentially-corrected GPS position in real time. The GPS receiver 26 transmits the position data to a personal computer (PC) 32 which runs the BIOSONICS DT4000 operating software and records data digitally. The hydroacoustic transducer 36 is connected to the sounder 34 which is connected to the PC 32. The BIOSONICS DT4000 operating software is commercially available from Biosonics, Inc. which is located in Seattle, Wash. The BIOSONICS DT4000 system transmits short ultrasonic sound pulses downward into the water column from the vertically-mounted transducer and measures the intensity of the returned echoes. These intensities are digitized within the transducer, sent to the PC, merged with DGPS data and stored on the PC's hard disk. Following data collection, a signal processing algorithm (SAVAA) converts the raw digital data file to a position-referenced file of depth and plant attribute information. These are input to commercially-available GIS or mapping software which performs spatial interpolation and map generation.

Figure 2:
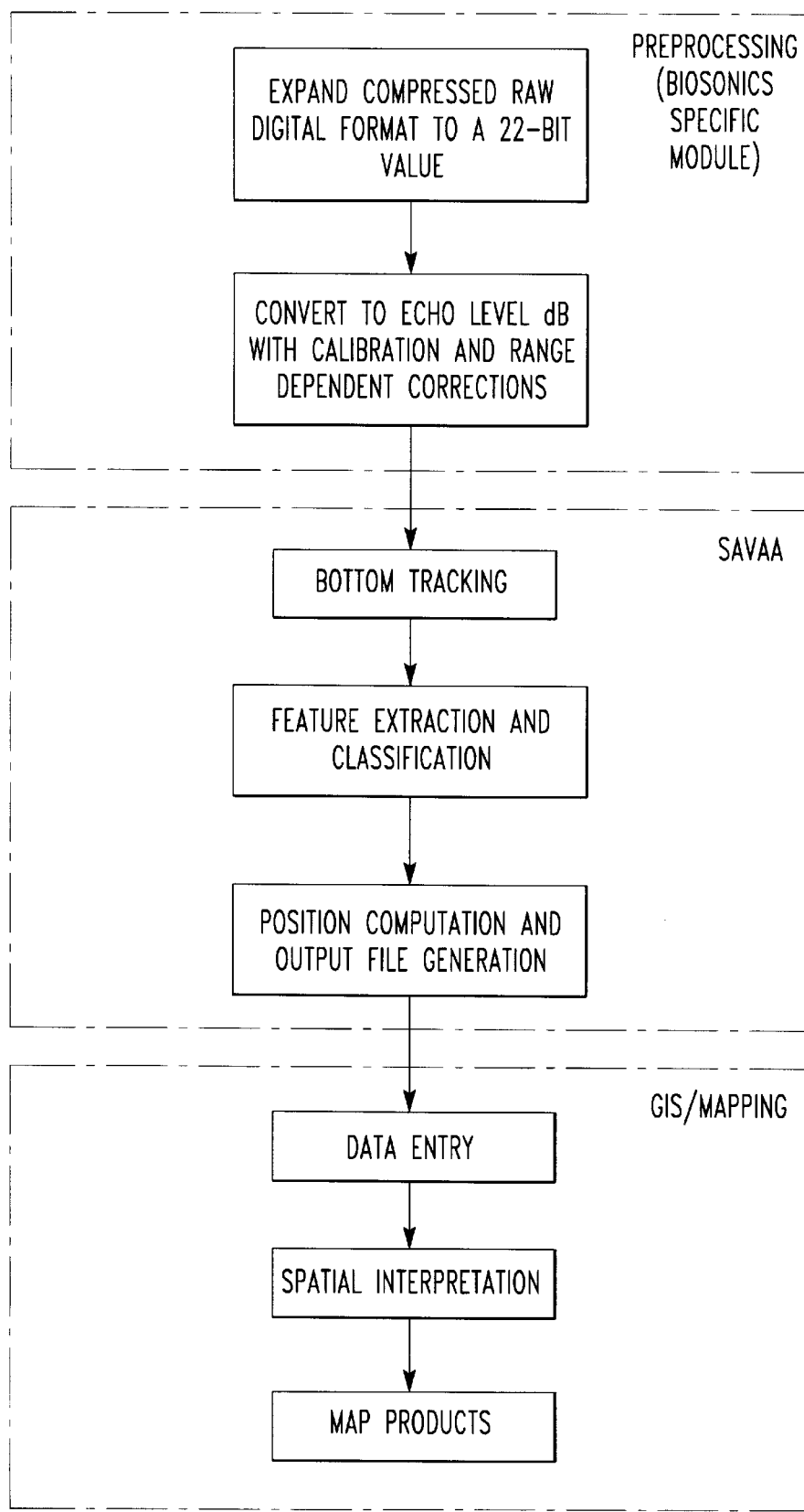
FIG. 2 is a schematic illustration showing general data processing steps used in a preferred embodiment of the method of the present invention.

(b) SAVAA Description. After signal data have been collected, a raw hydroacoustic/position data file, in a Biosonics-proprietary format, resides on the PC hard disk and is ready for processing. Data processing is performed to: 1) calibrate and add time-varied-gain corrections on the raw signal, 2) detect and track the bottom, 3) detect and characterize SAV, 4) generate a file for entry into the GIS and 5) generate map products using the GIS. These steps are depicted in FIG. 2. The preprocessing step uncompresses the Biosonics-proprietary digital data and performs range and transducer dependent corrections to convert the signal to voltage squared units expressed in decibels (dB). This portion of the code is specific to the BIOSONICS DT4000 system; if a different hydroacoustic system were used only this portion of the code would require changing. Steps involved with processing this corrected signal to a file of position-referenced points with depth and plant attributes are embodied in the Submersed Aquatic Vegetation Analysis Algorithm (SAVAA). Version 1.0 of SAVVA is implemented on the Turbo Pascal computer language. Output of SAVAA is a generic ASCII file which could be processed to map products by any of the numerous GIS or graphics software packages available. The processing steps involved in SAVAA (subject of this invention) are described in the following sections.

SAVAA reads the series of preprocessed pings between GPS reports These pings (usually 20, given a ping rate of 10/second with a GPS report every other second) are processed as a group to first locate the bottom, then to extract signal features relevant to SAV and assign attributes to the SAV based on these features. When the next GPS report is encountered, the position of the report is computed as the average of the current and previous GPS report (in latitude and longitude). This represents the midpoint of all pings in the cycle. The computed position, depth and SAV attributes are then written to an ASCII file. The bottom tracking, feature extraction and classification and output algorithms are described below.

(c) Bottom Tracking. Bottom tracking has typically been problematic in dense SAV. Acoustic reflections from the tops of plants can be so strong that returns from the bottom are greatly diminished or entirely hidden. The effect of this "hidden bottom" problem is minimized within SAVAA because it is not necessary to locate the bottom in each individual ping-bottom location must only be determined and output every time a position report of 20 pings is encountered, typically enabling all pings in a cycle to be used in the determination.

Figure 3:
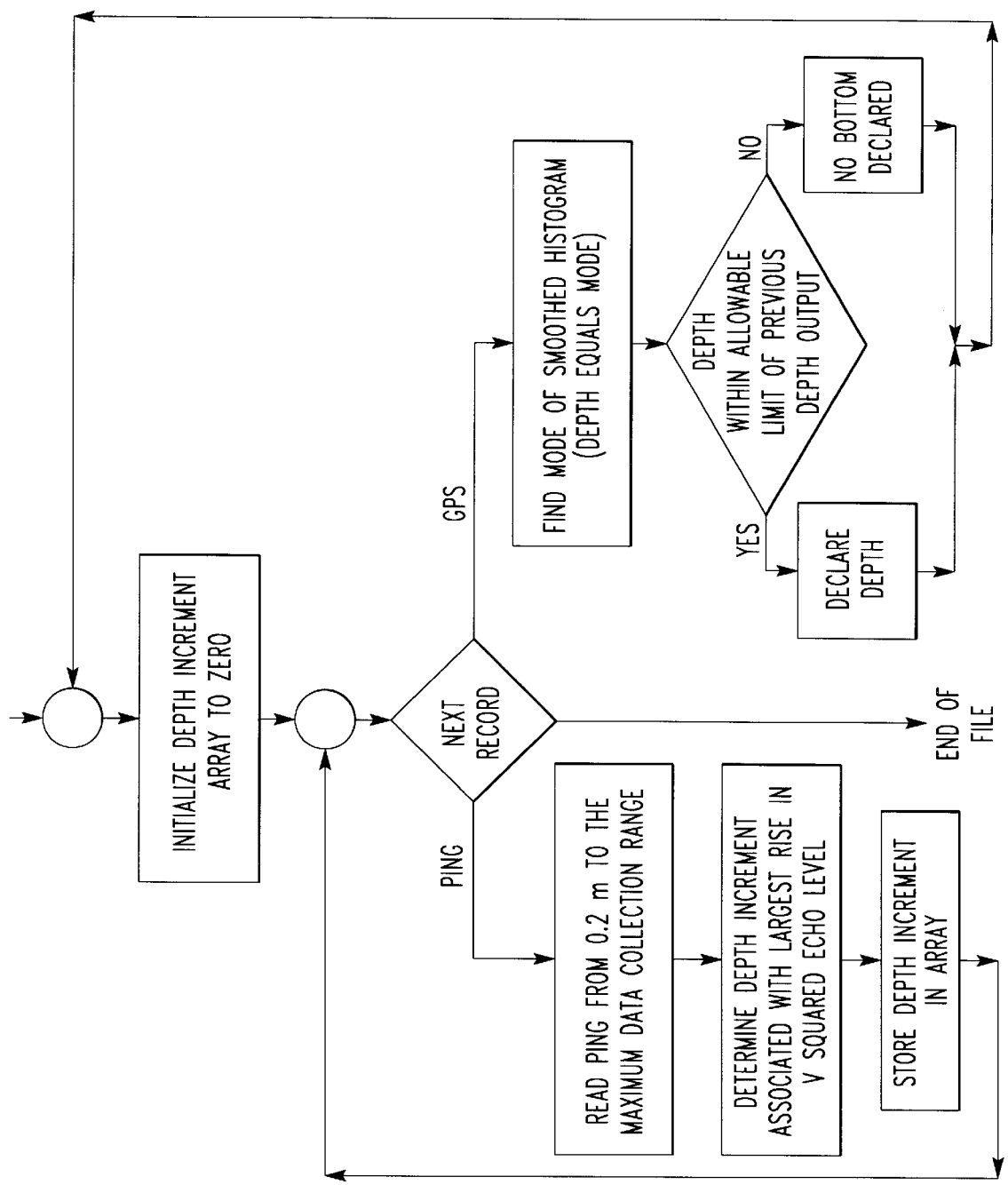
FIG. 3 is a schematic illustration showing steps for bottom tracking in a preferred embodiment of the method of the present invention.

Several common physical characteristics of SAV-inhabited environments are exploited to make this determination. Over the course of a short distance, such as that traveled by the survey boat in the time between successive GPS reports (2 seconds, corresponding to $\leq 5$ m), bottom depth in most SAV-inhabited lentic environments typically changes very little, usually no more than several tenths of a meter. If canopy-forming SAV species are present then the height of the canopy (measured in each ping) typically vary widely from ping to ping. Additionally, even in dense SAV areas, there are gaps in the canopy which allow a unobstructed "view" of the bottom by the vertically-aimed hydroacoustic transducer. If a histogram is made of the depth of a bottom-type hydroacoustic feature for the 20 pings, the most commonly occurring value (mode) will typically be the bottom. This is the basis for the bottom tracking algorithm implemented in SAVAA and illustrated in FIG. 3.

Each bottom determination is begun by initializing an array of digitizing depth increments (layer approximately equal to 1.8 cm for the BIOSONICS DT4000 sounder) to zero. Each ping is examined from 0.2 m from the transducer to the maximum recorded depth to determine the depth increment corresponding to the greatest rise in voltage squared. This depth element is incremented by 1 in the array. This process is repeated until all pings between two successive GPS reports have been processed. The array is then searched with a 5-element moving window to determine the center-element location at which the sum of 5 consecutive elements is greatest. This represents the mode, smoothed by a 5-element moving sum window. In cases of ties (multimodal distribution) the deepest mode is selected. The element number corresponding to the center of this window is multiplied by the depth increment of the array element (1.8 cm for the BIOSONICS DT 4000). The product is designated as the bottom depth of that cycle.

(d) SAV Features, Extractions and Classifications. Once the location of the bottom within a small region has been identified, the water column above the bottom is examined for characteristics indicating SAV. Conceptually, this is done by examining the spatial distribution of the above-noise signal from 0.2 m depth to the identified bottom. Environments occupied by canopy-forming SAV species typically exhibit certain physical and hydroacoustic characteristics. The depth at which the first "above noise" signal occurs is indicative of the top of the plants. Between this height and the bottom, most layers are also above threshold, giving the appearance of "fingers" connected to the bottom. The height of these fingers varies from ping to ping and they tend to be randomly distributed over a local region instead of all emanating from a single point. For any waterbody and time of year, there is a depth below which SAV is not found due to light limitation. Combining these characteristics, it is possible to distinguish SAV from other features commonly occurring in the water column.

Figure 4:
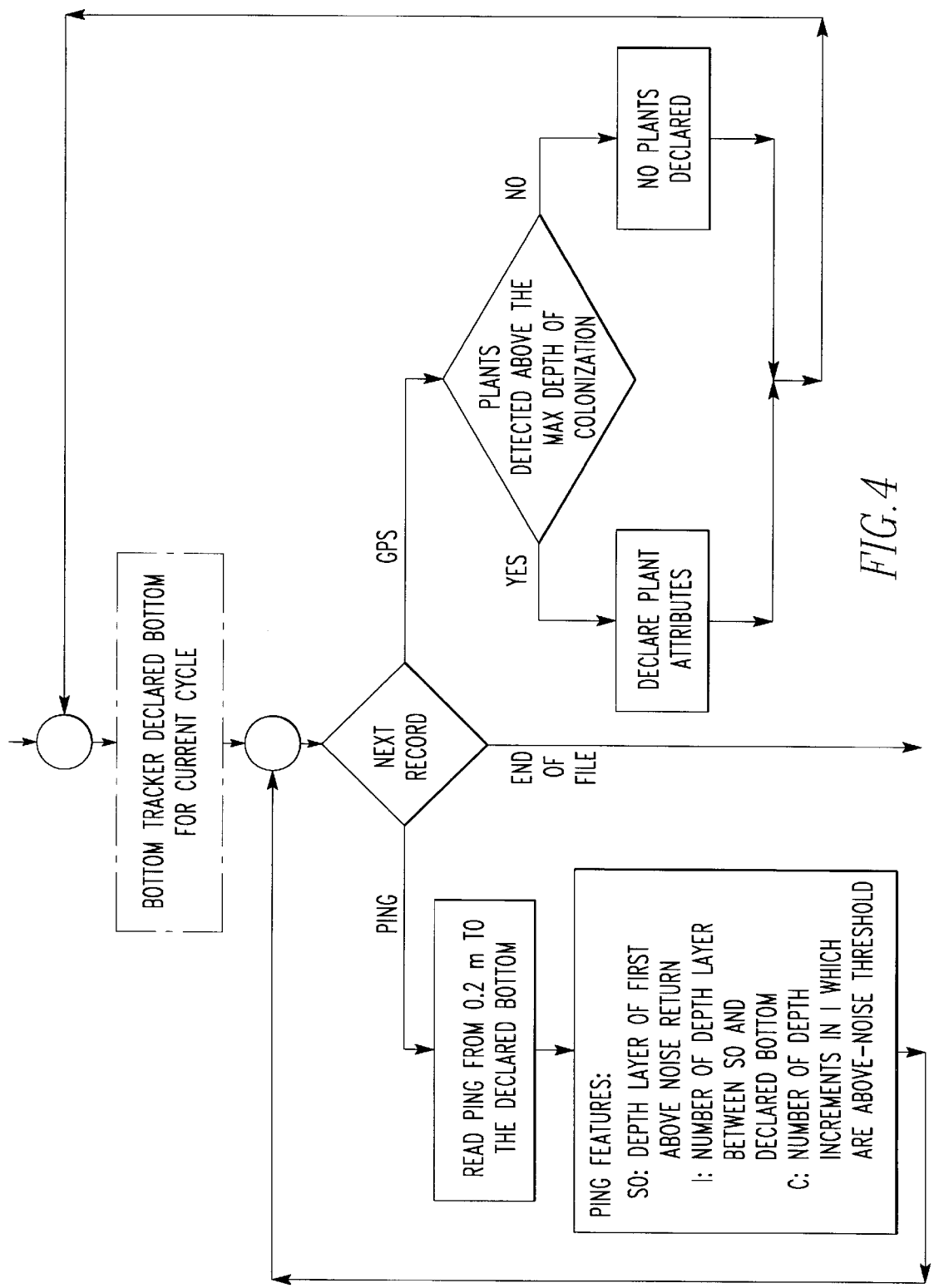
FIG. 4 is a schematic illustration showing additional steps for vegetation detection in a preferred embodiment of the method of the present invention.

(i) Features. These characteristics are implemented in the SAVAA code as a set of features, decision rules and attribute calculations (FIG. 4). After a bottom depth ($B_j$) has been declared for a given cycle (j) of pings (all pings between 2 sequential GPS reports), echo return levels in each ping between 0.2 m and the bottom are examined. For each ping (i) in cycle (j), the following features are measured and temporarily stored:

1. the depth layer corresponding to the first above-noise threshold echo return ($S_{o,i}$);

2. number of depth increments ($I_i$) between $S_{o,i}$ and the current bottom declaration ($B_j$); and 3. number of depth increments ($C_i$) in $I_i$ which are also above the noise threshold.

(ii) Decision Rules. After features in all pings within a cycle have been computed, the number of pings are counted for which $I > T_i$ (user-selected threshold #1, currently set to 10 depth increments or 18 cm). If there are fewer than a user-input number of such occurrences, a "no plants" declaration is output along with the current bottom depth ($B_j$) and the processing is begun on the next cycle of pings (j+1). If there are more than this user-input number of occurrences, then this subset of pings is examined using a compound Boolean operator to determine plant presence. The following three conditions must simultaneously be true before plant presence is declared:

1. there is at least one ping for which (($I > T_1$) and (C/I=1.0)), i.e. there is at least one "finger", over 18 cm long, connected to the bottom; and 2. $\Sigma C_i / \Sigma I_i > T_2$ (user-selected threshold #2, currently set to 80%), i.e. the "fingers" are at least 80% solid.

3. $B_j \leq$ (maximum depth of plant colonization +0.3 m), i.e. the fingers are occurring at a depth suitable for plant colonization.

If FALSE is the result, then a "no plants" declaration is output along with the current bottom depth ($B_j$) and processing is begun on the next cycle of pings. If TRUE is the result, then plants are declared present and the SAV attributes are computed.

(iii) Output Attributes. SAVAA computes three SAV attributes-mean and maximum height, and areal coverage. Mean height is computed as the average of I (expressed in meters) for pings with $C/I > T_2$. Maximum height is the largest I value for which $C/I > T_2$. Areal coverage is estimated as 1.0 minus the portion of pings which have an unimpeded "view" of the bottom($I \leq T_1$).

SAVEWS may be operated either in a transect or a mapping mode. In the transect mode, the survey boat is run along a preselected linear path while data is collected. Data is then processed with SAVAA to a set of position referenced depth and plant attributes which may be displayed graphically. In the mapping mode the survey boat is run along a series of parallel transects within an area of interest. SAVAA processes these data and the output is then input to commercially-available GIS or mapping software which performs spatial interpolation and map generation.

The advantages of using SAVEWS for SAV detection and mapping relative to previous techniques include the fact that detectability is not limited by water clarity unlike optical remote sensing techniques. Further, detection, classification and mapping is a fully automated process requiring no intervention by the operator unlike the previously described hydroacoustic techniques. Also, large areas can be surveyed and mapped quickly relative to contact sampling techniques.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method of rapidly detecting the presence of submerged aquatic vegetation (SAV) in a waterbody, said method comprising the steps of:

(a) mounting an echo sounding transducer in a vertically downward orientation at the water's surface on a boat and setting up an electronic positioning system to generate horizontal position reports;

(b) causing the transducer to generate a rapid series of short hydroacoustic pulses (pings) and then to measure returning echo signals, and simultaneously gathering horizontal position reports from the electronic positioning system installed in (a) at a less frequent interval than the ping rate;

(c) causing the returning echo signal, consisting of a series of digital echo intensity values each corresponding to some small depth increment, along with the horizontal position data generated in (b) to be recorded and stored in digital form thereby generating a series of ping reports between two sequential horizontal position reports wherein said ping reports are calibrated in units of voltage squared which are proportional to echo intensity;

(d) examining the digital echo intensity values within each ping report to determine the exact depth at which the sharpest rise in voltage squared occurs and generating a histogram of these sharpest-rise depths for all pings in the cycle;

(e) examining the histogram of sharpest rise depths to determine the most commonly occurring sharpest rise depth in the cycle, using a 5-element moving sum filter, and comparing this cycle mode depth with that determined from the previous cycle;

(f) if the difference between the currect and the previous cycle mode depths determined in (e) is less than a user specificed depth difference limit, then the current mode is declared to be the bottom depth for the current cycle and the echo signals immediately above said bottom depth are examined for all pings in the cycle for echo intensity features characteristic of SAV; and (g) if the depth difference limit is exceeded in (f), then the process is repeated on the incoming digital data until the bottom depth test is successfully completed.

2. The method of claim 1 wherein the spatial distribution of echo intensities greater than a specified threshold is examined in the region directly above the declared bottom depth using the following steps:

(a) examining the echo intensity values within each ping report above the declared bottom depth for occurrence of echo intensity values above a user specified threshold wherein said examination is performed from near the water's surface downward to the declared bottom depth;

(b) declaring the presence of plants in each ping report examined when the following signal conditions simultaneously occur:
  (1) a first occurrence depth is identified corresponding to the shallowest depth for which the echo intensity is above a specified threshold;
  (2) a specified portion of the echo intensity values between the first occurrence depth and the bottom depth are also above the threshold echo intensity;
  (3) the depth difference between the first occurrence depth and the bottom depth is greater than a user-defined height threshold;
  (4) the declared bottom depth is shallower than an empirically determined maximum depth of plant colonization for the site being surveyed; and (c) declaring the plant height, within individual ping reports which pass the plant presence test in (b) above as the height difference between the first occurrence depth and the declared bottom depth.

3. The method of claim 2 wherein said additional steps are performed on each ping report in the cycle between successive horizontal position report.

4. The method of claim 2 comprising the further step of computing SAV attributes based on the plurality of ping reports in a cycle.

5. The method of claim 2 wherein SAV coverage within a cycle is computed as the portion of pings reports in the current cycle for wheich plants have been declared to be present.

6. The method of claim 2 wherein the mean plant height within a cycle is the average of plant heights in (c) for ping reports in that cycle in which plants have been declared to be present, and the maximum plant height within a cycle is the largest plant height among the ping reports within that cycle for which plants have been declared to be present.

7. The method of claims 1 and 2 wherein the horizontal position, associated with the bottom depth and SAV attributes of the cycle is computed by averaging the position data contained within the current and the previous horizontal position report.

* * * * *

UNITED STATES PATENT AND TRADEMARK OFFICE
CERTIFICATE OF CORRECTION

PATENT NO. : 5,805,525
DATED : Sep. 8, 1998
INVENTOR(S) : Brace Mayo Sabol, et al It is certified that error appears in the above-identified patent and that said Letters Patent is hereby corrected as shown below:

On title page, item [75] "Brace Mayo Sabol" should read --Bruce Mayo Sabol--

Signed and Sealed this

Thirteenth Day of April, 1999

Attest:

Q. TODD DICKINSON

*Attesting Officer*　　　*Acting Commissioner of Patents and Trademarks*